United States Patent
Chambliss et al.

(10) Patent No.: US 9,298,617 B2
(45) Date of Patent: Mar. 29, 2016

(54) PARALLEL DESTAGING WITH REPLICATED CACHE PINNING

(71) Applicant: INTERNATIONAL BUSINESS MACHINES CORPORATION, Armonk, NY (US)

(72) Inventors: David D. Chambliss, Morgan Hill, CA (US); Ehood Garmiza, Neve Ziv (IL); Leah Shalev, Zichron-Yaakov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 471 days.

(21) Appl. No.: 13/863,584

(22) Filed: Apr. 16, 2013

(65) Prior Publication Data
US 2014/0310464 A1     Oct. 16, 2014

(51) Int. Cl.
*G06F 12/00* (2006.01)
*G06F 12/08* (2006.01)
*G06F 12/12* (2006.01)
*G06F 11/10* (2006.01)

(52) U.S. Cl.
CPC ........ *G06F 12/0804* (2013.01); *G06F 11/1076* (2013.01); *G06F 12/126* (2013.01); *G06F 12/0868* (2013.01); *G06F 2211/1057* (2013.01)

(58) Field of Classification Search
CPC ..... G06F 12/00; G06F 12/0215; G06F 12/08; G06F 12/0811; G06F 12/0897
USPC .................. 711/100, 113, 119, 154
See application file for complete search history.

(56) References Cited

U.S. PATENT DOCUMENTS

| 5,636,359 A | * | 6/1997 | Beardsley | ........... G06F 12/0866 711/122 |
| 5,724,501 A | * | 3/1998 | Dewey | ................. G06F 12/0866 711/E12.019 |
| 5,784,548 A | * | 7/1998 | Liong | ....................... G06F 1/30 711/106 |
| 5,809,320 A | | 9/1998 | Jain et al. | |
| 5,933,860 A | | 8/1999 | Emer et al. | |
| 5,960,169 A | | 9/1999 | Styczinski | |
| 6,012,123 A | | 1/2000 | Pecone et al. | |
| 6,038,641 A | | 3/2000 | Zangenehpour | |

(Continued)

FOREIGN PATENT DOCUMENTS

| CN | 1664793 A | 9/2005 |
| CN | 101997918 A | 3/2011 |

(Continued)

OTHER PUBLICATIONS

Ripberger et al., "IBM System Storage DS8000 Storage Virtualization Overview," IBM, Apr. 13, 2010.

(Continued)

*Primary Examiner* — Tuan Thai
(74) *Attorney, Agent, or Firm* — Griffiths & Seaton PLLC

(57) ABSTRACT

Methods, apparatus and computer program products implement embodiments of the present invention that include identifying non-destaged first data in a write cache. Upon detecting second data in a master read cache, the second data is copied the second data to one or more backup read caches, and the second data is pinned to the master and the backup read caches. Using the first data stored in the write cache and the second data stored in the master read cache, one or more parity values are calculated, and the first data and the one or more parity values are destaged.

18 Claims, 7 Drawing Sheets

(56) References Cited

U.S. PATENT DOCUMENTS

| | | | |
|---|---|---|---|
| 6,101,615 A | 8/2000 | Lyons | |
| 6,243,795 B1 * | 6/2001 | Yang | G06F 11/1666 160/113 |
| 6,505,216 B1 | 1/2003 | Schutzman et al. | |
| 6,529,995 B1 | 3/2003 | Shepherd | |
| 6,714,789 B1 | 3/2004 | Oh et al. | |
| 6,775,738 B2 | 8/2004 | Ash et al. | |
| 7,593,974 B2 | 9/2009 | Suzuki et al. | |
| 7,657,509 B2 | 2/2010 | Clark et al. | |
| 7,849,356 B2 | 12/2010 | Jones et al. | |
| 7,945,732 B2 | 5/2011 | Koseki | |
| 7,987,158 B2 | 7/2011 | Boyd et al. | |
| 8,103,904 B2 | 1/2012 | Hafner et al. | |
| 8,112,395 B2 | 2/2012 | Patel et al. | |
| 8,156,368 B2 | 4/2012 | Chambliss et al. | |
| 8,494,063 B1 | 7/2013 | Reudink et al. | |
| 9,104,599 B2 | 8/2015 | Atkisson et al. | |
| 9,146,695 B2 | 9/2015 | Galloway et al. | |
| 2002/0091897 A1 | 7/2002 | Chiu et al. | |
| 2002/0170017 A1 | 11/2002 | Busser | |
| 2003/0204690 A1 | 10/2003 | Yamada et al. | |
| 2004/0093464 A1 | 5/2004 | Hassner et al. | |
| 2004/0128269 A1 | 7/2004 | Milligan et al. | |
| 2004/0139365 A1 | 7/2004 | Hosoya | |
| 2005/0015436 A1 | 1/2005 | Singh et al. | |
| 2005/0055630 A1 | 3/2005 | Scanlan | |
| 2005/0289296 A1 | 12/2005 | Balasubramanian | |
| 2006/0123270 A1 | 6/2006 | Forhan et al. | |
| 2006/0294301 A1 | 12/2006 | Zohar et al. | |
| 2007/0016754 A1 | 1/2007 | Testardi | |
| 2007/0028145 A1 | 2/2007 | Gerhard et al. | |
| 2007/0067667 A1 | 3/2007 | Ikeuchi et al. | |
| 2007/0079083 A1 | 4/2007 | Gladwin et al. | |
| 2008/0040553 A1 | 2/2008 | Ash et al. | |
| 2008/0195807 A1 | 8/2008 | Kubo et al. | |
| 2008/0201608 A1 | 8/2008 | Forhan et al. | |
| 2008/0263274 A1 | 10/2008 | Kishi et al. | |
| 2009/0049050 A1 | 2/2009 | Whitehead | |
| 2009/0089612 A1 | 4/2009 | Mathew et al. | |
| 2009/0216832 A1 | 8/2009 | Quinn et al. | |
| 2010/0199125 A1 | 8/2010 | Reche | |
| 2011/0153606 A1 | 6/2011 | Kim et al. | |
| 2011/0161299 A1 | 6/2011 | Prahlad et al. | |
| 2011/0202792 A1 | 8/2011 | Atzmony | |
| 2011/0208919 A1 | 8/2011 | Pruthi | |
| 2011/0208922 A1 | 8/2011 | Coronado et al. | |
| 2011/0208943 A1 | 8/2011 | Schott | |
| 2011/0225453 A1 | 9/2011 | Spry et al. | |
| 2011/0258391 A1 | 10/2011 | Atkisson et al. | |
| 2011/0282835 A1 | 11/2011 | Cannon et al. | |
| 2012/0110257 A1 | 5/2012 | Enohara et al. | |
| 2012/0210060 A1 | 8/2012 | Acuna et al. | |
| 2013/0024627 A1 * | 1/2013 | Benhase | G06F 12/0862 711/137 |
| 2014/0019421 A1 | 1/2014 | Jagadeesan | |
| 2014/0310244 A1 | 10/2014 | Chambliss et al. | |
| 2014/0310456 A1 | 10/2014 | Chambliss et al. | |
| 2014/0310457 A1 | 10/2014 | Chambliss et al. | |
| 2014/0310465 A1 | 10/2014 | Chambliss et al. | |
| 2014/0310489 A1 | 10/2014 | Chambliss et al. | |
| 2014/0310557 A1 | 10/2014 | Chambliss et al. | |
| 2015/0268883 A1 | 9/2015 | Chambliss et al. | |
| 2015/0268884 A1 | 9/2015 | Chambliss et al. | |
| 2015/0269026 A1 | 9/2015 | Chambliss et al. | |

FOREIGN PATENT DOCUMENTS

| | | |
|---|---|---|
| CN | 102185929 A | 9/2011 |
| WO | 2014170791 A3 | 10/2014 |

OTHER PUBLICATIONS

Rodeh, "B-trees, Shadowing and Clones," ACM Transactions on Computational Logic, vol. V, No. N, IBM, Aug. 2007.

Sivathanu, et al., Improving Storage System Availability with D-GRAID, ACM Transactions on Storage, vol. 1, No. 2, May 2005. http://pages.cs.wisc.edu/~muthian/dgraid-tos.pdf.

* cited by examiner

PARALLEL DESTAGING WITH REPLICATED CACHE PINNING

FIELD OF THE INVENTION

The present invention relates generally to data storage, and specifically to destaging dirty cache data.

BACKGROUND

When processing I/O requests, computer storage systems typically implement read and write caches in order to enhance performance. A read cache typically comprises high-speed memory that is configured to store data that was recently retrieved from a disk, plus data that the computer system anticipates will be requested in the near future.

For example, if a storage system receives a read request to retrieve data from a specific physical region of a storage device, in addition to processing the retrieval request, the computer system may also retrieve data from physical regions on the storage device that follow the specific region, and load the retrieved data to the read cache. In operation, if a host computer issues a read request for data that is currently in the read cache, then the storage system conveys the data directly from the read cache to the host computer, thereby eliminating the need to physically retrieve the data from the disk. Read performance is therefore enhanced, since retrieving data from the read cache is much faster than retrieving the data from the disk.

When processing a write request received from a host computer, the storage system stores the write request data in the write cache, and then conveys an acknowledgement to the host computer that the data has successfully been written to the disk. Upon receiving the acknowledgement, the host computer can proceed as if the data has successfully been written to the disk. In operation, the storage system is configured to destage (i.e., transfer) data from the write cache to the disk at a subsequent time, typically when the write cache reaches a specific utilization level. Data stored in the write cache that has not yet been destaged to the disk is referred to herein as "dirty" cache data. Write performance is therefore enhanced, since the write cache data (comprising data from multiple write requests) can usually be transferred to the disk in a smaller number of physical write operations than would have been required had each write request been individually stored to the disk.

SUMMARY

There is provided, in accordance with an embodiment of the present invention a method, including identifying non-destaged first data in a write cache, and upon detecting second data in a master read cache, copying the second data to one or more backup read caches, pinning the second data to the master and the backup read caches, calculating, using the first data stored in the write cache and the second data stored in the master read cache, one or more parity values, and destaging the first data and the one or more parity values.

There is also provided, in accordance with an embodiment of the present invention a storage system, including a memory configured to store data in a master read cache, a master write cache, at least one backup read cache, and at least one backup write cache, and a processor configured to identify non-destaged first data in the write cache, and upon detecting second data in a master read cache, to copy the second data to one or more of the backup read caches, to pin the second data to the master and the backup read caches, to calculate, using the first data stored in the master write cache and the second data stored in the master read cache, one or more parity values, and to destage the first data and the one or more parity values.

There is further provided, in accordance with an embodiment of the present invention a computer program product, the computer program product including a non-transitory computer readable storage medium having computer readable program code embodied therewith, the computer readable program code including computer readable program code configured to identify non-destaged first data in a write cache, and computer readable program code configured, upon detecting second data in a master read cache, to copy the second data to one or more backup read caches, to pin the second data to the master and the backup read caches, to calculate, using the first data stored in the write cache and the second data stored in the master read cache, one or more parity values, and to destage the first data and the one or more parity values.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
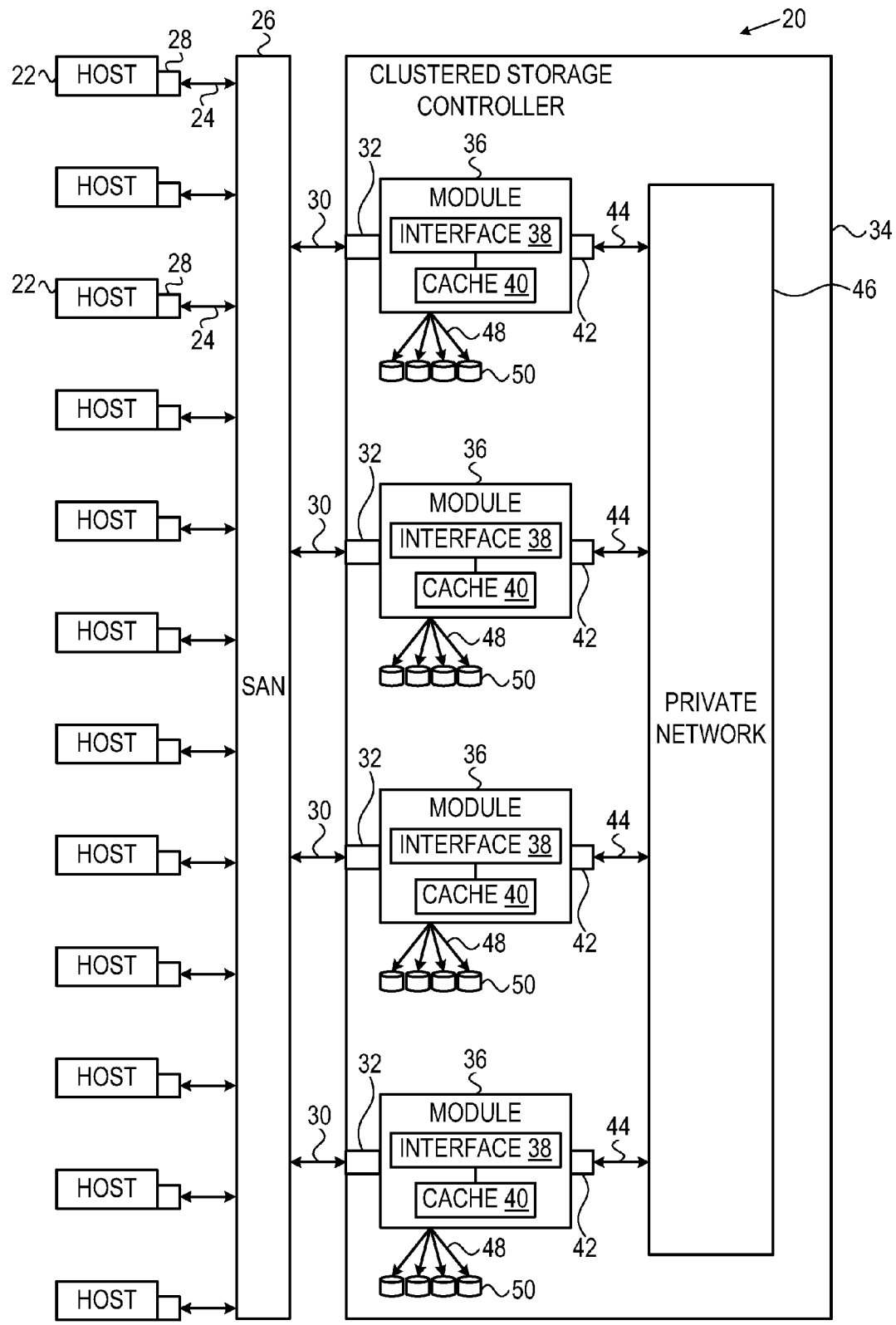
FIG. 1 is a block diagram that schematically illustrates a storage system, in accordance with an embodiment of the present invention.

Redundant array of independent disks (RAID), is a storage technology that combines multiple storage devices into a single logical unit. Data can be distributed across the storage devices in one of several ways called "RAID levels", depending on what level of redundancy and performance is desired.

One common RAID level implemented in storage systems is RAID 6. According to the Storage Networking Industry Association (San Francisco, Calif.), RAID 6 comprises "Any form of RAID that can continue to execute read and write requests to all of a RAID array's virtual disks in the presence of any two concurrent disk failures." In a typical RAID 6 configuration, each region of a given storage device has corresponding regions on each of the other storage devices, where two of the corresponding regions are used to store parity computations. For example, four storage devices having corresponding regions may be configured in a RAID 6 2+2 configuration, wherein each set of four corresponding regions comprises two regions configured to store data, and two regions configured to store parity computations.

Since there are many latency-introducing layers between a component of the storage system that calculates the parity values and the individual storage devices, which might not share physical location or performance characteristics, it can be difficult to guarantee simultaneous update of all storage devices in the RAID 6 configuration described supra. In the event of a failure of any component of the storage system, some of the writes may succeed and some may fail, leaving the data on the storage devices in an inconsistent state, thereby possibly preventing reliable reconstruction of the data.

Embodiments of the present invention provide methods and systems for processing data write requests in a storage system implementing a RAID 6 configuration. As describe supra, in a RAID 6 configuration, each location (i.e., that is storing data in a region) on a given storage device has corresponding locations on the other storage devices.

In some embodiments, upon receiving a request to write first data to a first location on a first storage device, second data is retrieved from corresponding second locations on one or more second storage devices. The first and the second data comprise data used for parity computations for two additional corresponding locations on two parity storage devices. Locations on the parity storage devices are also referred to herein as parity locations.

After retrieving the second data, the second data can be pinned to a master cache and at least one backup cache. Pinning the second data "locks" the second data, thereby preventing the storage system from modifying or removing the second data from the caches. In embodiments of the present invention, data pinning may be cumulative. In other words, if subsequent to pinning the second data, any additional data is pinned to the master and the backup caches, the second data remains pinned.

The second data can be unpinned from the cache upon calculating the two parity computations and successfully destaging the first data and the parity computations to the storage devices. As explained hereinbelow, pinning the second data to the caches can enable the storage system to recover from a hardware and/or software failure without any loss of data.

FIG. 1 is a block diagram that schematically illustrates a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

While the configuration of storage subsystem 20 in FIG. 1 shows each module 36 comprising an adapter 32 that is configured to communicate with SAN 26, other configurations of the storage subsystem are considered to be within the spirit and scope of the present invention. For example, in an alternative configuration, adapter 32 is included in a subset of modules 36.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

While the configuration of storage subsystem 20 shown in Figure has the storage subsystem storing data to physical storage devices 50, other storage apparatuses are considered to be within the spirit and scope of the present invention. For example, storage subsystem 20 may store data to one or more data clouds or storage virtualization devices (SVD).

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

In operation, storage system 20 may store a given set of data in a storage management unit (SMU). Examples of storage management units include but are not limited to logical volumes, storage pools and slices. In the embodiments described herein, a slice comprises a set of partitions on a given storage device 50, and a logical volume may comprise multiple slices distributed among the multiple storage devices.

Figure 2:
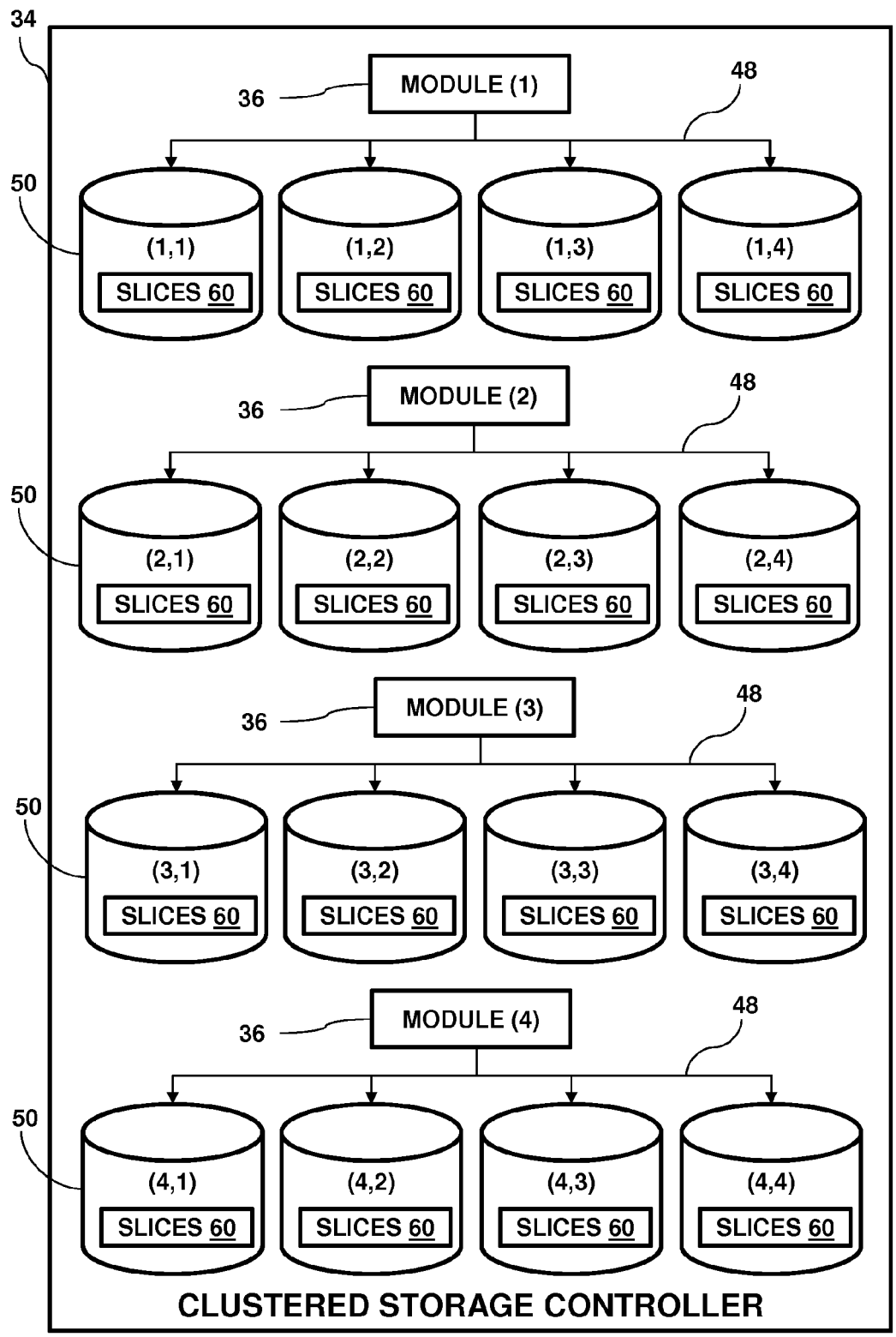
FIG. 2 is a block diagram that schematically illustrates an example of storage management units stored on a storage system, in accordance with an embodiment of the present invention.

FIG. 2 is a block diagram that schematically illustrates an example of storage management units (SMU) configured as slices 60 stored on storage devices 50 of clustered storage controller 34 (also referred to herein as a storage system), in accordance with an embodiment of the present invention. While the embodiments herein describe distributing metadata storage for slices 60, distributing metadata storage for other types of storage management units is considered to be within the spirit and scope of the present invention. For example, the embodiments described herein can be used to distribute metadata for other types of storage management units such as logical volumes and storage pools.

Additionally, in the embodiments described herein, each module 36 may be referenced by an identifier (A), where A is an integer representing a given module 36. As shown in FIG. 2, there are four modules 36 that may be referenced as module 36(1), module 36(2), module 36(3) and module 36(4).

Furthermore, each storage device 50 may be referenced by an ordered pair (A,B), where A is defined above, and where B is a number representing a given storage device 50 coupled to the given module via data connection 48. For example, storage devices 50(3,1), 50(3,2), 50(3,3) and 50(3,4) are coupled to module 36(3) via data connection 48.

Figure 3A:
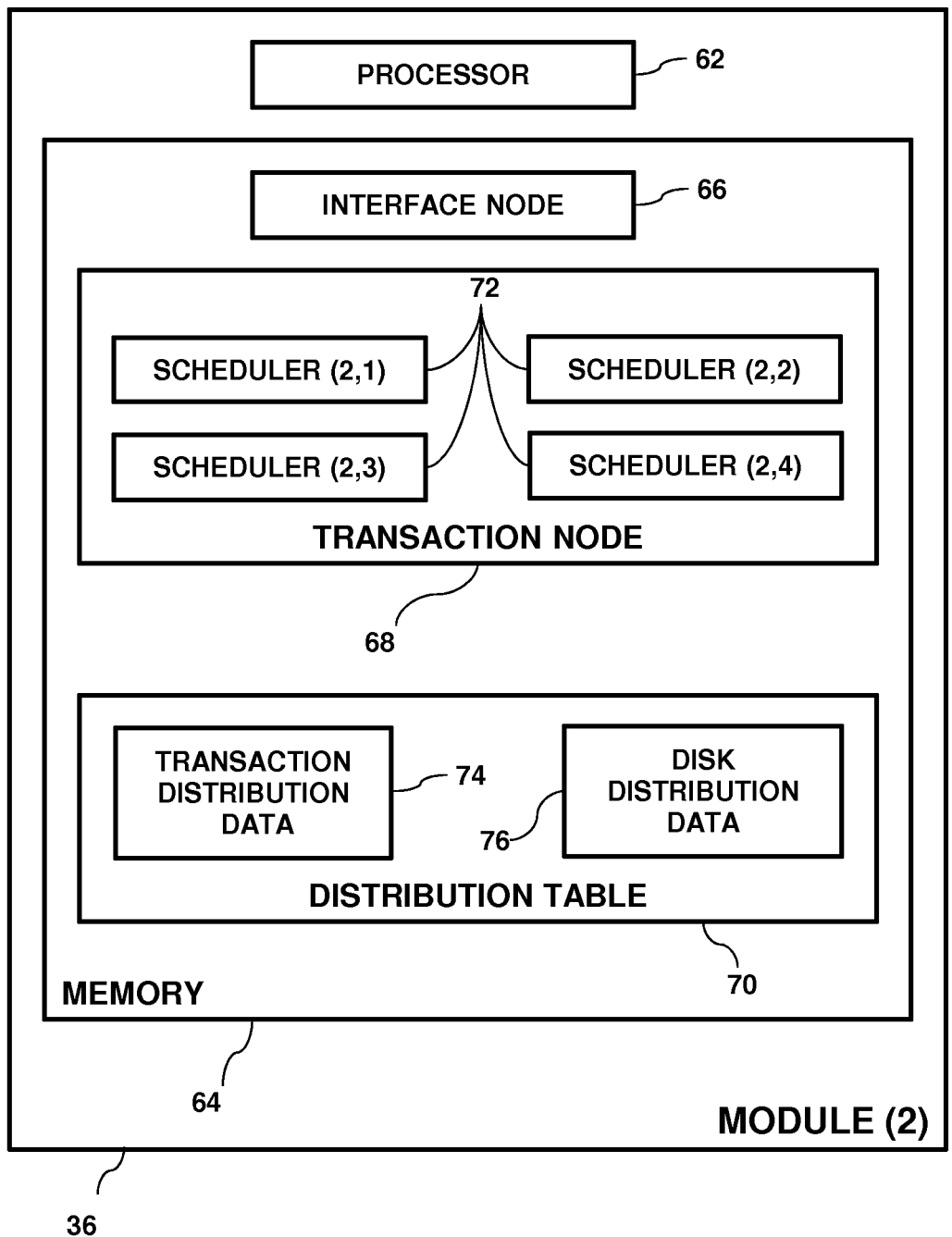
FIGS. 3A-3D, referred to collectively as FIG. 3, are block diagrams that schematically show functional elements of a module of the storage system, in accordance with an embodiment of the present invention.

FIG. 3A is a block diagram that schematically illustrates functional elements of module 36, in accordance with an embodiment of the present invention. Module 36 comprises a processor 62 and a memory 64. For a given module 36 configured to include adapter 32, memory 64 comprises an interface node 66 (i.e., not all memories 36 in storage system 20 include the interface node). Memory 36 also comprises a transaction node 68 and a distribution table 70. In operation, processor 62 executes interface node 66 and transaction node 68 from memory 64.

Processor 62 typically comprises a general-purpose computer, which is programmed in software to carry out the functions described herein. The software may be downloaded to processor 62 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

Interface node 66 comprises a software application that is configured to receive I/O requests from a given host computer 22, and to convey the I/O request to a given transaction node 68. Additionally, upon the given transaction node completing the I/O request, interface node 66 conveys a result of the I/O request to the given host computer. For example, if the I/O request comprises a write operation, then the conveyed result may comprise an acknowledgement of the write. Alternatively, if the I/O request comprises a read operation, then the conveyed result may comprise data retrieved from storage devices 50.

Transaction node 68 comprises a software application that processes I/O requests via multiple schedulers 72, which manage a set of slices 60. While the configuration of transaction node 68 shown in FIG. 3A comprises four schedulers 72, any number of schedulers is considered to be within the spirit and scope of the present invention. In some embodiments, processor 62 may execute each scheduler 72 on a separate thread (also known as a logical core) of the processor.

In embodiments described herein, each scheduler 72 may be referenced by an ordered pair (A,C), where A is defined above, and C is a number representing a given scheduler 72 executing within the given module. In the example shown in FIG. 3A, the first scheduler 72 in module 36(2) may be referred to herein as scheduler 72(2,1), the second scheduler 72 in module 36(2) may be referred to herein as scheduler 72(2,2), the third scheduler in module 36(2) may be referred to herein as scheduler 72(2,3), and the fourth scheduler 72 in module 36(2) may be referred to herein as scheduler 72(2,4).

As described supra, storage controller 34 may configure a logical volume as a set of slices 60, wherein each of the slices comprises a set of regions on a given storage device 50. For example, a given logical volume may comprise four slices 60 spread over storage devices 50(1,2), 50(2,3), 50(3,4) and 50(4,2). There may be instances where a given storage device stores more than one slice for a given logical volume. Additionally, as described in detail hereinbelow, processor 62 may store multiple copies of a given slice. For example, processor 62 may store a first copy of a given slice 60 on a first storage device 50 (also referred to herein as the primary storage device for the given slice), and an additional copy of the given slice on a second storage device 50 (also referred to herein as the secondary storage device for the given slice).

In embodiments of the present invention, each slice 60 can be associated with a first scheduler 72 that can be configured as a master scheduler, and one or more additional schedulers 72 that can be configured as backup schedulers. Differences between the master and the backup schedulers are described hereinbelow. In the event of a failure of the master scheduler, processor 62 can reconfigure one of the backup schedulers to function as the master scheduler, thereby ensuring the continuous availability of data stored in storage controller 34.

As described supra, processor 62 may store part of a first copy of a given slice 60 on a first data storage device 50, and the reminder of a first copy on a second data storage device 50, and parity data derived from the slice 60 on one or more parity storage devices 50. In the event of a failure of one of the data or parity storage devices, processor 62 can reconstruct the data that had been stored on the failed device from the data that can be read from the surviving devices. If more than one parity storage device is used according to a RAID-6 scheme then data recovery can be performed after failure of more than one of the storage devices. The data recovery ensures the continuous availability of data stored in storage controller 34.

Processor 62 can store associations between the slices, the schedulers and the storage devices to distribution table 70. Distribution table 70 comprises transaction distribution data 74 and disk distribution data 76. Transaction distribution data 74 can be configured to store associations between the slices and the schedulers, and disk distribution data 76 can be configured to store associations between the slices and the storage devices.

Figure 3B:
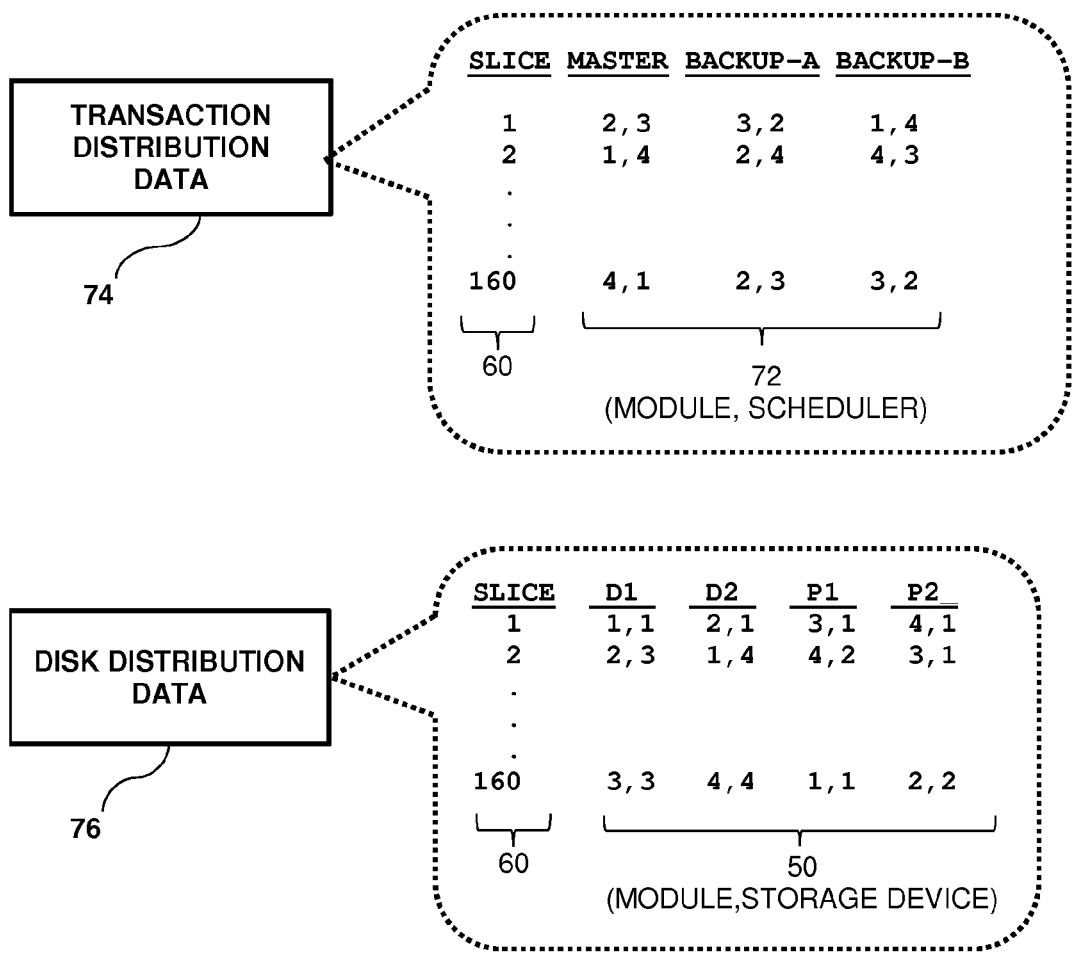

FIG. 3B is a block diagram that schematically illustrates example entries in transaction distribution data 74 and disk distribution data 76, in accordance with an embodiment of the present invention. In the example shown in FIG. 3B, each slice 60 is associated with a master and two backup schedulers 70, and two data and two parity storage devices 50.

In the embodiments described herein, each slice may be referenced by an identifier (D), where D is a number representing a given slice 60. In the configuration shown in FIGS. 3B-3D, storage controller 34 comprises 160 slices 60 that can be referenced as slice 60(1)-slice 60(160). Identifier D is also referred to herein as a slice number, so that each slice 60 has an associated slice number, and in the example D is an integer between 1 and 160. As shown in transaction distribution data 74, scheduler 72(2,3) is configured as the master scheduler and schedulers 72(3,2) and 72(1,4) are configured as the backup schedulers (i.e., BACKUP1 and BACKUP-B as shown the figure) for slice 60 (1).

In embodiments described herein, storage controller 34 implements a RAID 6 2+2 configuration for slices 60 as follows:

Two storage devices 50 storing the data regions are referred to as D1 and D2. For example, each one megabyte partition may comprise two 512K regions striped across D1 and D2.

Two storage devices 50 storing the parity computations for D1 and D2 are referred to as P1 and P2.

Each region on a given storage device 50 in a RAID 6 configuration has corresponding regions in the other storage devices in the RAID 6 configuration. In the configuration shown in FIG. 3B, upon interface node 66 receiving a request to write first data to a volume number and logical address referencing a first region on a first storage device (e.g., D1), transaction node 68 stores the first data to cache 40, conveys the first data to the backup scheduler(s) for the slice to be stored in their cache(s), and conveys an acknowledgment indicating completion of the write operation. At some later time, the transaction node retrieves second data from a corresponding second region on a second storage device (e.g., D2), stores the second data to cache 40, conveys the second data to the backup scheduler(s) to be stored in their cache(s), and performs two parity computations based on the first and the second data. At some second later time, the transaction node can destage the first data to the first region, and the parity values to the corresponding regions on the storage devices referenced by P1 and P2. The corresponding regions on the storage devices referenced by P1 and P2 are also referred to herein as corresponding parity regions.

In the configuration shown in FIG. 3B, disk distribution data 76 stores the RAID 6 configuration for each slice 60. For example, slice 60(1) comprises storage device 50(1,1) configured as D1, storage device 50(2,1) configured as D2, storage device 50(3,1) as P1 and storage device 50(4,1) as P2. As shown in the Figure, there may be different RAID 6 disk distributions for different slices 60. For example, slice 60(2) comprises storage device 50(2,3) configured as D1, storage device 50(1,4) configured as D2, storage device 50(4,2) as P1 and storage device 50(3,1) as P2.

As shown in the Figures, for a given slice 60 (i.e., a given SMU), the master scheduler, the backup scheduler(s), the primary storage device and the secondary storage device(s) can be distributed among different modules 36 of storage system 20. Additionally, each module 36 may store any number (including zero) of master and backup schedulers 72.

Figure 3C:
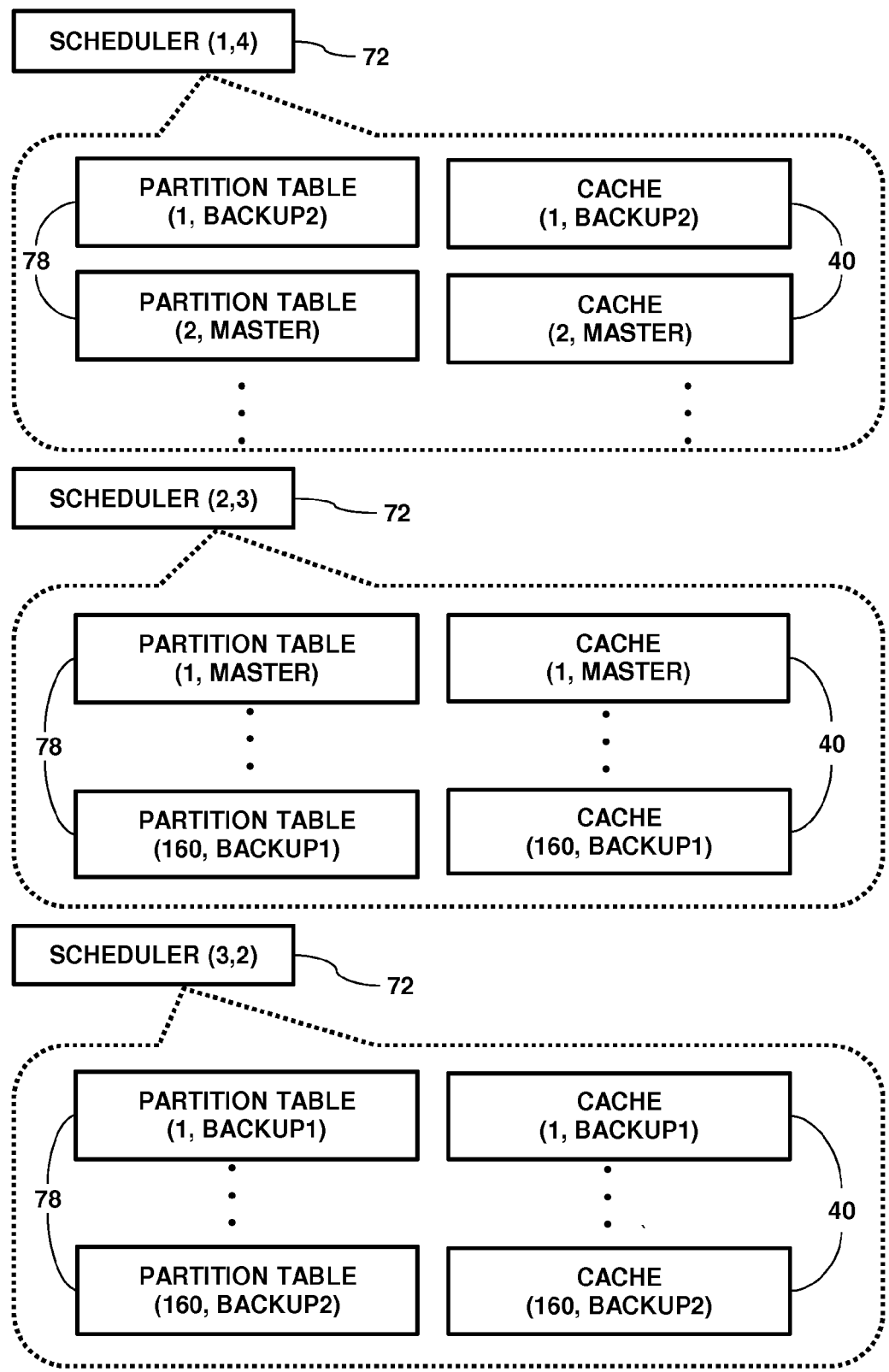

FIG. 3C is a block diagram that schematically illustrates schedulers 72(1,4), 72(2,3) and 72(3,2) in accordance with an embodiment of the present invention. Each scheduler 72 comprises pairs of partition tables 78 and caches 40, wherein each of the pairs is associated with a given slice 60. Each entry in a given partition table 78 corresponds to a partition (i.e., a region) on a given storage device 50, and comprises a data structure (e.g., an array) that enables processor 62 to map a given volume number and logical address to the partition. Operation of caches 40 is described in FIG. 1, hereinabove.

As described supra, each scheduler 72 can be associated with a given slice 60 and can function as either a master scheduler or a backup scheduler for the given slice. In the example shown in FIGS. 3B-3C, each slice 60 has a master scheduler 72 ("MASTER") and two backup schedulers 72 ("BACKUP1" and "BACKUP-B"). Likewise, each partition table 78 may be referenced by an ordered pair (D,E), where D is a number representing a given slice 60, and E describes a role of a given partition table 78, and each cache 40 may be referenced by an ordered pair (D,F), where D is defined above, and F describes a role of a given cache 40. In embodiments described herein each slice 60 has a master cache 40 and two backup caches 40 (i.e., BACKUP1 and BACKUP-B).

Continuing the example described supra, the schedulers shown in FIG. 3C comprise the schedulers associated with slice 60(1). As shown in the Figure, scheduler 72(2,3) comprises partition table 78(1, MASTER) and cache 40(1, MASTER), scheduler 72(3,2) comprises partition table 78(1, BACKUP1) and cache 40(1, BACKUP1), and scheduler 72(1,4) comprises partition table 78(1, BACKUP-B) and cache 40(1, BACKUP-B).

In embodiments described herein, processor 62 can map an I/O request to a given scheduler 72, as opposed to mapping the I/O request to a given module 36 or a given storage device 50. By mapping I/O requests to schedulers 72, embodiments of the present convention "decouple" partition tables 78 from storage devices 50. In other words, upon receiving an I/O request, interface node 66 may convey the I/O request to a first module 36 executing a given scheduler 72 comprising a given partition table 78, wherein the given partition table references a given storage device 50 coupled to a second module 36.

Figure 3D:
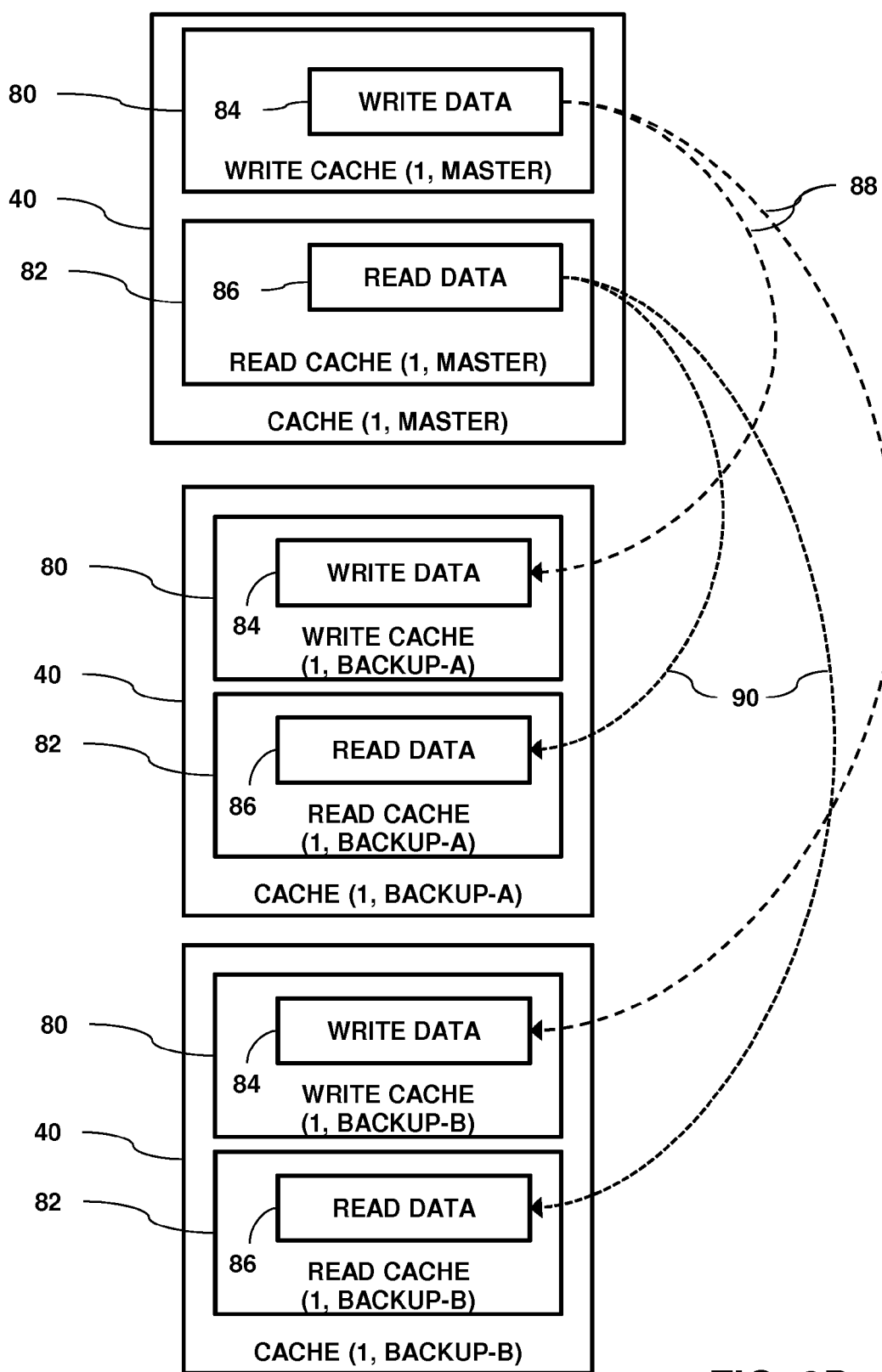

FIG. 3D is a block diagram that schematically illustrates caches 40, in accordance with an embodiment of the present invention. Each cache 40 comprises a write cache 80 configured to store write data 82 and a read cache 84 configured to store read data 86. Each write cache 80 may be referenced by an ordered pair (D,E), and each read cache 82 may be referenced by an ordered pair (D,E), where D and E are defined above.

In the example shown in FIG. 3D, while processing a request to write first data to a given partition in slice 60(1) on storage device 50(1,1) (i.e., D1), scheduler 72(2,3) stores the first data to write cache 80(1, MASTER), and then copies write data 84 from write cache 80(1, MASTER) to write cache 80(1, BACKUP1) and write cache 80(1, BACKUP-B), as indicated by arrows 88. In the embodiments described herein, upon scheduler 72(2,3) detecting the first data in write data 80(1, MASTER) (i.e., the master cache for slice 60(1) is "dirty"), the scheduler can retrieve second data from a corresponding partition in storage device 50(2,1) (i.e., D2), and store second data to read data 86 in read cache 82(1, MASTER). Scheduler 72(2,3) also copies read data 86 from read cache 82(1, MASTER) to read cache 82(1, BACKUP1) and read cache 82(1, BACKUP-B), as indicated by arrows 90.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Pinning and Destaging Cache Data

Figure 4:
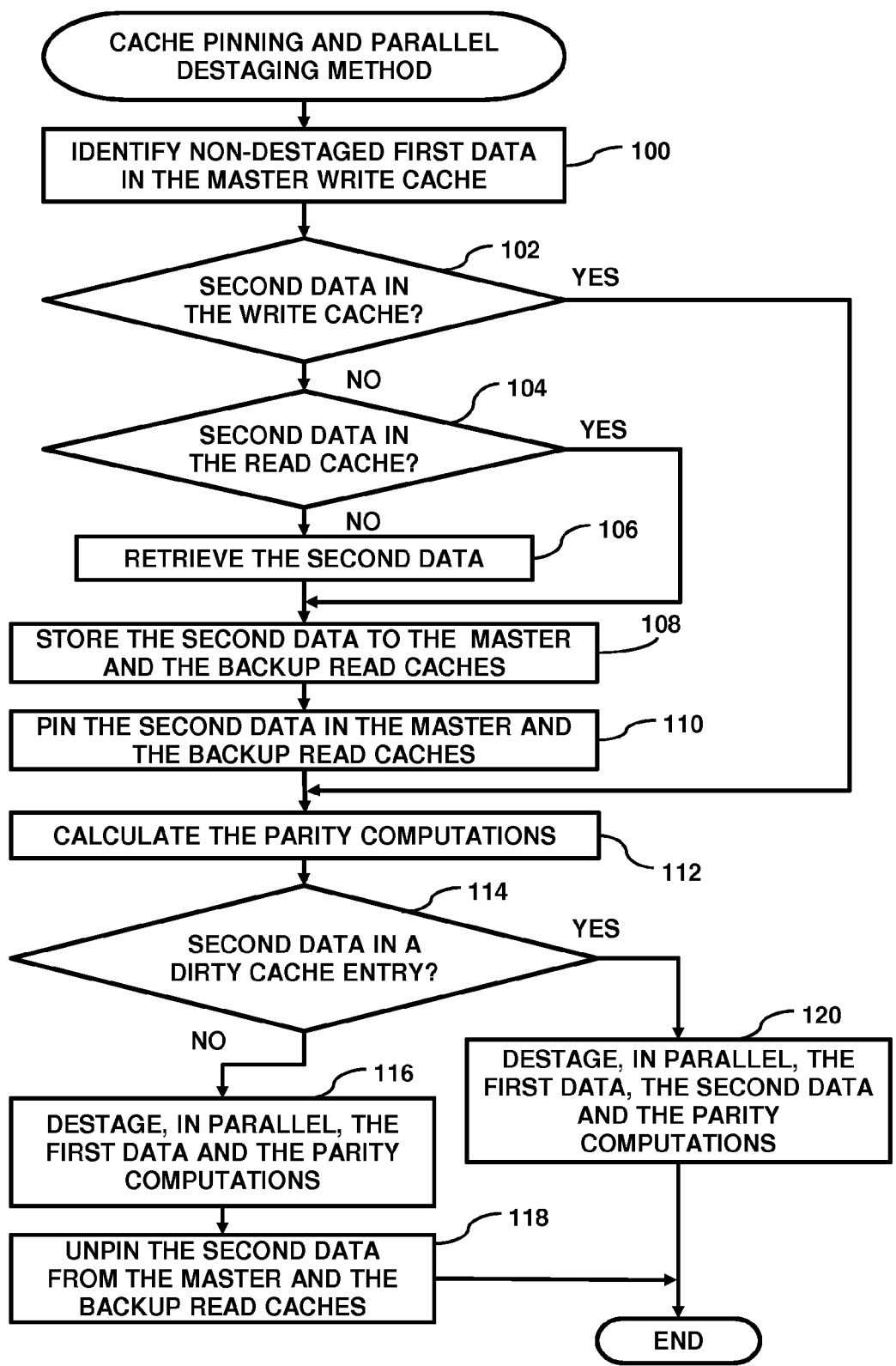
FIG. 4 is a flow diagram that schematically illustrates a method of cache pinning and destaging, in accordance with an embodiment of the present invention.

FIG. 4 is a flow diagram that schematically illustrates a method of pinning write data 84 and read data 86, and destaging in parallel, the write data and the read data to storage devices 50, in accordance with an embodiment of the present invention. Prior to the steps listed in the flow diagram, processor 62 processed a request to write first data to a first given data storage device 50 (e.g., D1 in the RAID 6 2+2 configuration described supra), by storing the first data to a write data 84 in a first write cache 80 configured as a master write cache. In some embodiments processor 62 copies the first data from the master cache to one or more additional write caches 80 configured as backup write caches.

First write cache 80 is a component of a first cache 40 that is configured as a master cache. First cache 40 also comprises a first read cache 82 configured as a master read cache. Likewise, each of the additional write caches are components of additional caches 40 that are configured as backup caches. Each of additional caches 40 also comprise an additional read cache 82 configured as a backup read cache.

In a detection step 100, processor 62 detects the first data in the master write cache, indicating that the first data has not yet been destaged to the first given data storage device. To calculate one or more parity computations, processor 62 uses the first data and second data that is typically stored on a second given data storage device 50 (e.g., D2 in the RAID 6 2+2 configuration described supra).

In a first comparison step 102, if processor 62 does not detect the second data in the master write cache, and in a second comparison step 104, the processor does not detect the second data in the master read cache, then in a retrieve step 106, the processor retrieves the second data from the second given data storage device. In a storing step 108, processor 42 stores the second data to the master read cache and the one or more backup read caches.

In a pinning step 110, processor 62 pins the second data in the master and the backup read caches, and in a calculation step 112, the processor calculates, using the first and the second data, one or more parity computations.

If in a third comparison step 114, processor 62 detects the second data in a dirty cache entry in the master write cache, then in a first destaging step 120, the processor destages the first data and the second data from the write cache to their corresponding data storage devices 50, and stores the one or more parity computations to their corresponding parity storage devices 50, and the method ends. In some embodiments, in step 120, processor destages and stores the first data, the second data, and the one or more parity values (all) in parallel.

Returning to step 114, if processor 62 does not detect the second data in a dirty cache entry in the master write cache (i.e., the second data is stored in the master read cache), then in a second destaging step 116, the processor destages (i.e., transfers), from the master write cache, the first data to the first given data storage device, and stores the one or more parity computations to corresponding parity storage devices 50 (e.g., the processor destages two parity computations to P1 and P2 in the RAID 6 2+2 configuration described supra). In some embodiments, processor 62 destages the first data and stores the one or more parity values in parallel. In an unpinning step 118, processor 62 unpins the second data from the master and the backup read caches, and the method ends.

Returning to step 104, if processor 62 detects the second data in the read cache, then the method continues with step 108. For example, while processing a previous read request, processor may have previously retrieved the second data from the second given data storage device, and stored the second data to the master read cache. Since the second data is already in the master read cache, processor 62, in step 104, copies the second data from the master read cache to the one or more backup caches.

Returning to step 102, if processor 62 detects the second data in the master write cache, then the method continues with step 112. For example, while processing a previous write request, processor may have previously stored the second data to the master write cache. If processor 62 detects the second data in the master write cache, then in step 112, the processor calculates the one or more parity computations using the first and the second data stored in the master write cache.

There may be instances when one or more software and/or hardware modules of storage controller 34 fail during the first or the second destaging steps (i.e., step 116 or step 120, resulting in not all the data was destaged from the master write cache to the storage devices before the failure. For example, in step 116, the master scheduler only successfully destaged the first data and one of the cache computations prior to the failure.

In embodiments of the present invention, upon restarting after the failure, processor 62 can check a state of the master read cache to determine whether or not data has successfully been destaged to the data and/or the parity storage devices. For example, processor 62 may detect pinned data (e.g., D1 and/or D2) in the master read cache (i.e., indicating that the failure occurred prior to step 118 in the flow diagram), and return to either step 112 or 114, as necessary. In instances where processor 62 cannot determine if the data was successfully destaged, the processor can return to a specific step in the flow diagram e.g., step 112.

In some embodiments, the master scheduler receives a write operation from a given host 22 that attempts to change the first or second data while the second data is still pinned, and the master scheduler enables the write operation to proceed without waiting until the destaging step is completed. In some embodiments this is achieved by receiving the new first data into a separate location to be merged into the previous first data or the second data after unpinning. In alternative embodiments, this may be achieved by terminating the computation or destaging step, receiving the new first data, and resuming the operation with the computation step.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising: identifying non-destaged first data in a write cache; and
    upon detecting second data in a master read cache:
        copying the second data to one or more backup read caches;
        pinning the second data to the master and the backup read caches;
        calculating, using the first data stored in the write cache and the second data stored in the master read cache, one or more parity values;
        destaging the first data and the one or more parity values;
        identifying the second data in the write cache, calculating, using the first and the second data stored in the write cache, one or more parity values, storing the one or more parity values to the write cache, and destaging the first data, the second data and the one or more parity values.

2. The method according to claim 1, wherein detecting the second data comprises retrieving the second data from a data storage device, and storing the retrieved second data to the master read cache.

3. The method according to claim 1, wherein detecting the second data comprises locating the second data in the master read cache.

4. The method according to claim 1, wherein destaging the first data and the one or more parity values comprises transferring the first data from the write cache to a data storage device, and storing the one or more parity values to one or more corresponding parity storage devices.

5. The method according to claim 4, and comprising upon recovering from a storage system failure, recalculating, using the first data stored in the write cache and the second data stored in the master read cache, one or more parity values, and destaging the first data and the one or more parity values.

6. The method according to claim 1, wherein destaging the first data, the second data and the one or more parity values comprises transferring, from the write cache, the first data to a first data storage device and the second data to a second data storage device, and storing the one or more parity values to one or more corresponding parity storage devices.

7. The method according to claim 1, wherein the first data, the second data and the one or more parity values are destaged in parallel.

8. The method according to claim 1, and comprising unpinning the second data from the master and the backup read caches upon destaging the first data and the one or more parity values.

9. The method according to claim 1, wherein the write cache comprises a master write cache having one or more backup write caches.

10. A storage system, comprising: a memory configured to store data in a master read cache, a master write cache, at least one backup read cache, and at least one backup write cache; and a processor configured to identify non-destaged first data in the write cache, and upon detecting second data in a master read cache, to copy the second data to one or more of the backup read caches, to pin the second data to the master and the backup read caches, to calculate, using the first data stored in the master write cache and the second data stored in the master read cache, one or more parity values, and to destage the first data and the one or more parity values;

wherein the processor is configured to identify the second data in the write cache, to calculate, using the first and the second data stored in the write cache, one or more parity values, to store the one or more parity values to the write cache, and to destage the first data, the second data and the one or more parity values.

11. The storage system according to claim 10 wherein the processor is configured to detect the second data comprises by the second data from a data storage device, and storing the retrieved second data to the master read cache.

12. The storage system according to claim 10, wherein the processor is configured to detect the second data by locating the second data in the master read cache.

13. The storage system according to claim 10, wherein the processor is configured to destage the first data and the one or more parity values by transferring the first data from the write cache to a data storage device, and storing the one or more parity values to one or more corresponding parity storage devices.

14. The storage system according to claim 13, wherein upon recovering from a storage system failure, the processor is configured to recalculate, using the first data stored in the write cache and the second data stored in the master read cache, one or more parity values, and to destage the first data and the one or more parity values.

15. The storage system according to claim 10, wherein the processor is configured to destage the first data, the second data and the one or more parity values by transferring, from the write ache, the first data to a first data storage device, the second data to a second data storage device, and storing the one or more parity values to one or more corresponding parity storage devices.

16. The storage system according to claim 10, wherein the processor is configured to destage, in parallel, the first data, the second data and the one or more parity values.

17. The storage system according to claim 10, wherein the processor is configured to unpin the second data from the master and the backup read caches upon destaging the first data and the one or more parity values.

18. A computer program product, the computer program product comprising: a non-transitory computer readable storage medium having computer readable program code embodied therewith, the computer readable program code comprising: computer readable program code configured to identify non-destaged first data in a write cache; and computer readable program code configured, upon detecting second data in a master read cache, to copy the second data to one or more backup read caches, to pin the second data to the master and the backup read caches, to calculate, using the first data stored in the write cache and the second data stored in the master read cache, one or more parity values, and to destage the first data and the one or more parity values;

wherein the computer program code further configured to identify the second data in the write cache, to calculate, using the first and the second data stored in the write cache, one or more parity values, to store the one or more parity values to the write cache, and to destage the first data, the second data and the one or more parity values.

* * * * *